United States Patent [19]
Maligne

[11] Patent Number: 5,630,486
[45] Date of Patent: May 20, 1997

[54] MECHANICAL ACTUATION DEVICE FOR DRUM BRAKE

[75] Inventor: Jean Charles Maligne, Aubervilliers, France

[73] Assignee: AlliedSignal Europe Service Techniques, Drancy, France

[21] Appl. No.: 545,742

[22] PCT Filed: Oct. 12, 1995

[86] PCT No.: PCT/FR95/01331

§ 371 Date: Nov. 3, 1995

§ 102(e) Date: Nov. 3, 1995

[87] PCT Pub. No.: WO96/15387

PCT Pub. Date: May 23, 1996

[30]  Foreign Application Priority Data

Nov. 9, 1994 [FR] France ............... 94 13435

[51] Int. Cl.$^6$ ................................ F16D 65/22
[52] U.S. Cl. ..................... 188/328; 188/106 F
[58] Field of Search ..................... 188/328, 327, 188/325, 106 F, 196 BA, 79.54, 79.56, 79.64

[56] References Cited

U.S. PATENT DOCUMENTS

| 4,249,646 | 2/1981 | Roberts | 188/328 |
| 4,387,792 | 6/1983 | Imamura | 188/328 |
| 5,070,968 | 12/1991 | Evans | 188/79.64 |
| 5,127,495 | 7/1992 | Verner et al. | 188/106 F |
| 5,275,260 | 1/1994 | Evans et al. | 188/79.64 |
| 5,538,112 | 7/1996 | Last | 188/79.54 |
| 5,553,691 | 9/1996 | Mery et al. | 188/106 F |

FOREIGN PATENT DOCUMENTS

| 0419171 | 3/1991 | European Pat. Off. . |
| 2697599 | 5/1994 | France . |
| 2697600 | 5/1994 | France . |

*Primary Examiner*—Douglas C. Butler
*Attorney, Agent, or Firm*—Leo H. McCormick, Jr.

[57] ABSTRACT

A drum brake including a carrier plate (10) on which there are slidably mounted first and second shoes (12, 14) capable of being brought into frictional engagement against an internal face of the drum (20) by a hydraulic actuation device (22). A variable-length strut (40) which, in interaction with a tension spring (30), determines the separation of the shoes (12, 14) and which is located in the vicinity of the hydraulic actuation device (22). A brace (100) is located on the web (14a) of the first shoe (14) and includes an active part (114) interposed retractable between the first end of the web (14a) of the first shoe (14) and one end (79) of the force-transmission actuation device (60, 70).

10 Claims, 3 Drawing Sheets

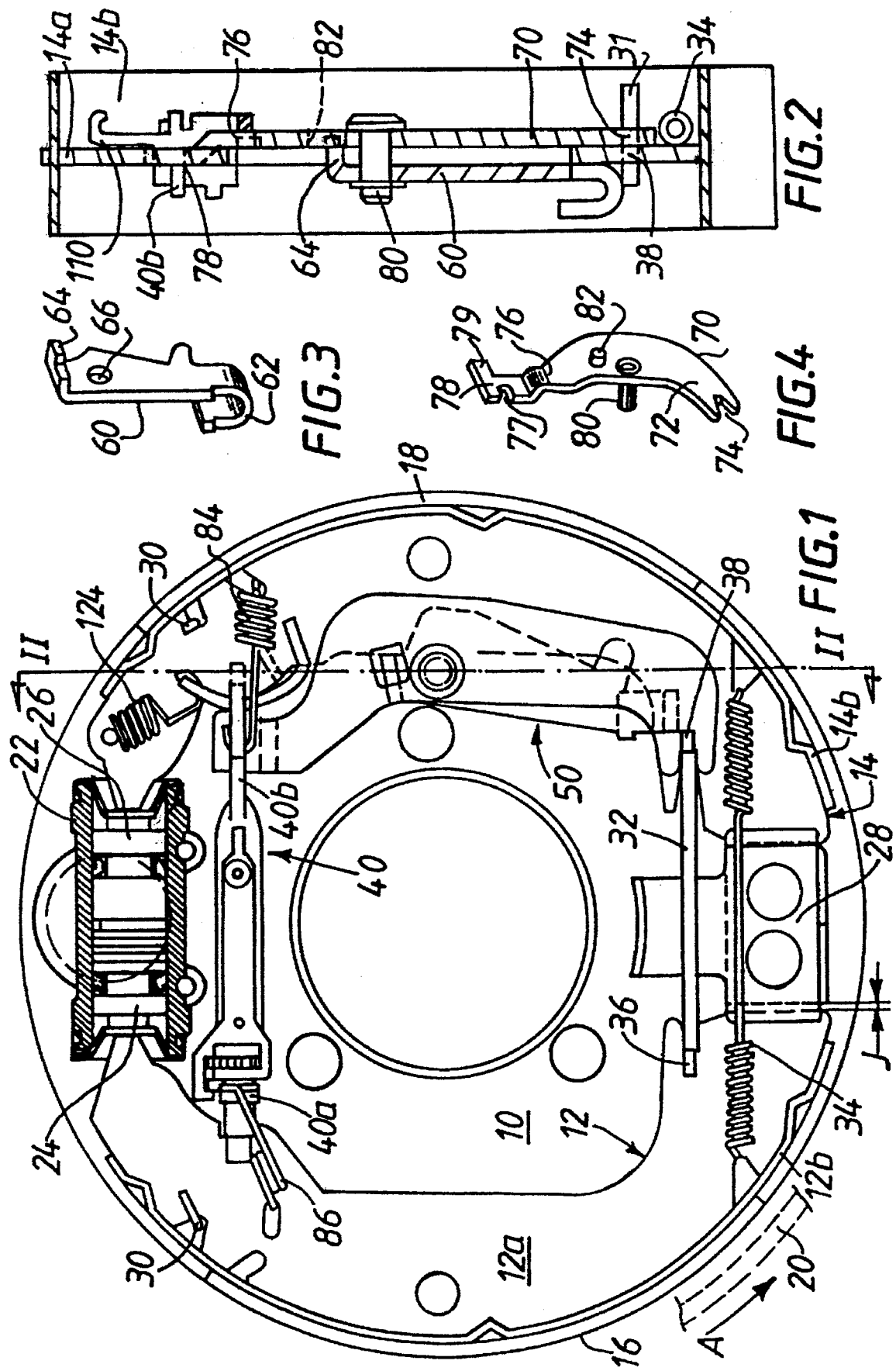

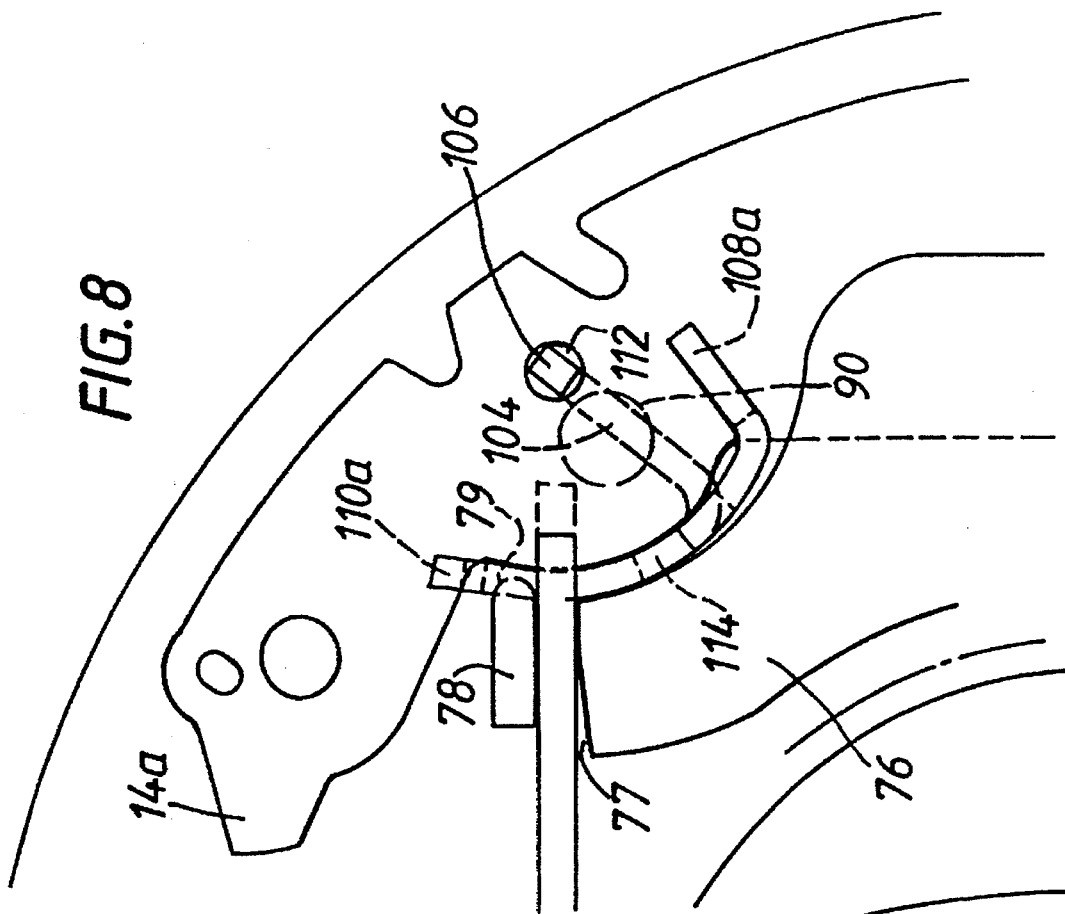
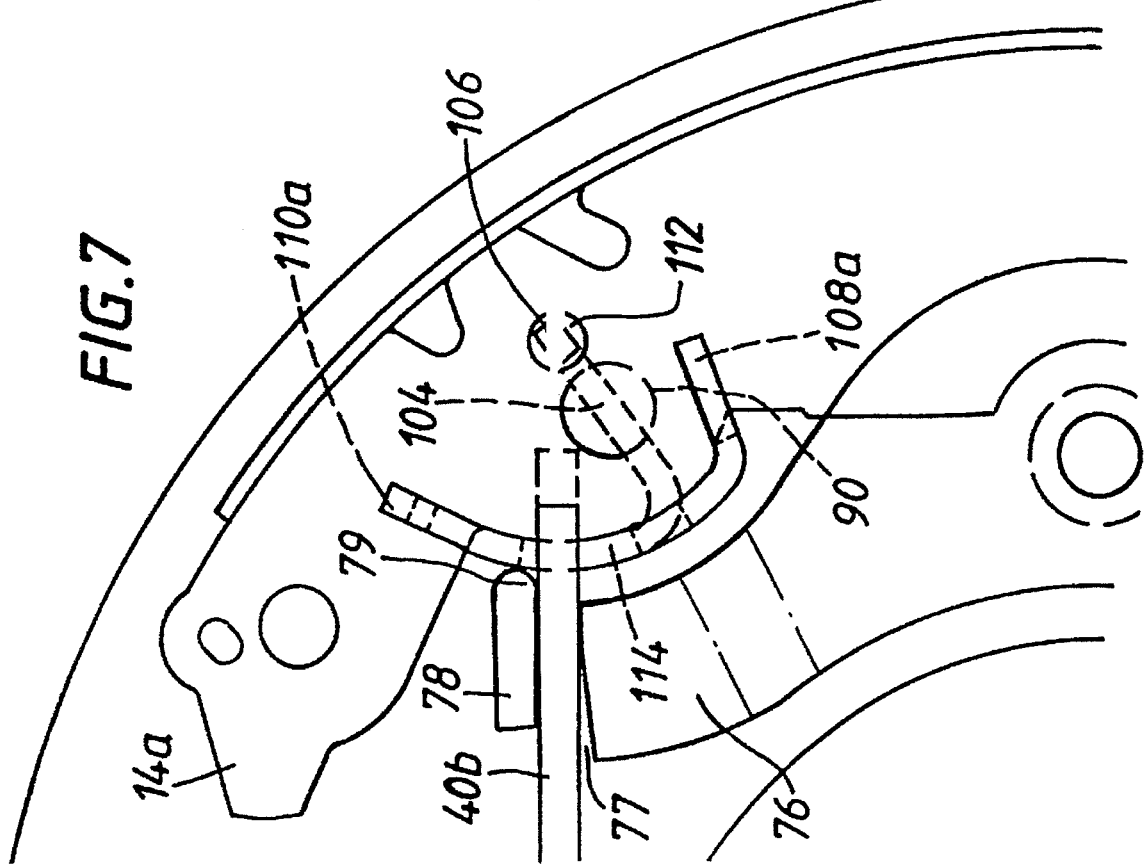

MECHANICAL ACTUATION DEVICE FOR DRUM BRAKE

The present invention relates to drum brakes, intended in particular to provide braking for motor vehicles. These drum brakes generally include a hydraulic actuation device constituting the main brake motor, and a mechanical actuation device, constituting an auxiliary brake motor, to fulfil, for example, the parking brake or emergency brake functions.

Conventionally, drum brakes include a carrier plate integral with a stationary part of the vehicle such as a stub-axle holder, and a drum integral with the wheel to be braked. Two shoes, each one including a web and a rim part provided with a friction lining, are slidably mounted on the carrier plate.

A hydraulic actuation device generally consists of a wheel cylinder which includes two pistons sliding in a bore and defining between them a sealed chamber in which a rise in pressure causes separation of the pistons, and therefore of the shoes, the webs of which are kept bearing on the pistons by springs.

A mechanical actuation device generally consists of a lever, mounted so that it can pivot on one of the webs, the end of one of the arms is connected to an operating cable, and the other arm of the lever acts on a strut bearing on the other shoe by means of springs, so that rotating this lever causes the separation of the shoes.

According to one design of drum brake, the actuation device is located between a first end of the webs of the shoes, while a second end of the webs of the shoes bears on a bearing piece integral with the carrier plate. Such a design is known in the art by the expression "floating shoe brake", due to the fact of absence of anchorage of the webs of the shoes on the bearing piece. It gives high stability of the drum brake, but requires a very high actuating force.

According to another design, known in the art under the term "duo-servo", the actuation device is located between a first end of the webs of the shoes, the other ends of the webs of the shoes being articulated to one another, the carrier plate not having a bearing piece. This design gives the drum brake very high effectiveness, but very mediocre stability.

There are known, for example from documents FR-A-2,697,599, FR-A-2,697,600 or EP-A-0,419,171, drum brakes which combine these two designs, that is to say in which the hydraulic actuation device is of the floating-shoe type, and in which the mechanical actuation device is of the duo-servo type.

The drum brakes thus produced thus combine the advantages of the two technologies while avoiding their drawbacks. However, such a combination gives rise to another drawback.

What happens is that in any drum brake, the combination of hydraulic and mechanical actuating devices means that a system for automatically taking up wear has to be provided so that the travel of the mechanical actuation device is constant regardless of the state of wear of the friction linings.

A system for automatic take-up of wear conventionally consists of a screw-nut system mounted on the strut of the mechanical actuation device, located between the webs of the shoes, generally in the vicinity of the hydraulic actuation device, so that the length of the strut is increased, upon hydraulic actuation, if the webs of the shoes separate by a distance greater than a predetermined value, following wear of the friction linings. The travel of the mechanical actuation system thus keeps a substantially constant value.

When the drum brake is dismantled, for example for operations of maintenance or for changing the shoes or the drum, it is sufficient to cause the lever of the mechanical actuation device to pivot in the opposite direction from that of its normal actuation so that the shoes come together under the action of the various tension springs used in the drum brake. In that way, the shoes and in particular the friction linings, radially leave the track which they have made in the internal face of the drum, and it is therefore possible to extract them axially from the drum brake.

Now, in the drum brakes mentioned earlier, where the hydraulic actuation device is of the floating-shoe type and the mechanical actuation device is of the duo-servo type, the latter device requires the presence on the web of one of the shoes of a force-transmission device which, when the drum brake is mechanically actuated, bears on the variable-length strut and on a connecting piece, both of these bearing on the web of the other shoe.

This force-transmission device cannot be tilted or pivoted on the shoe which carries it, so that extraction from the drum when dismantling the drum brake can take place only by manually unscrewing the nut of the screw-nut system in order to reduce the length of the variable-length strut, so that the shoes can come together and the friction linings can leave the rubbing track formed on the drum.

The objective of the present invention is therefore to produce a drum brake in which the hydraulic actuation device is of the floating-shoe type and the mechanical actuation device is of the duo-servo type, and in which the drum can be dismantled very simply and under all circumstances without moreover detracting from the operational reliability of the drum brake and without significantly increasing the manufacturing cost thereof.

To this end, the present invention provides a drum brake including a carrier plate on which there are slidably mounted two shoes each one including a web and a rim section of which the face opposite the drum receives a friction lining capable of being brought into frictional engagement against an internal face of the drum by a hydraulic actuation device acting on a first end of the webs of the shoes, a variable-length strut which, in interaction with a tension spring, determines the separation of the shoes and which is located in the vicinity of the hydraulic actuation device, a second end of the webs of the shoes bearing, when the drum brake is at rest or hydraulically actuated, on a bearing piece integral with the carrier plate, the drum brake further comprising a mechanical actuation device for bringing the friction linings into frictional engagement against the internal face of the drum and the webs of the shoes away from the bearing piece by means of a force-transmission device mounted on the web of a first shoe and bearing, when the drum brake is mechanically actuated, on the web of a second shoe by means, on the one hand, of the variable-length strut and, on the other hand, of a means for joining the two shoes together.

According to the invention, a brace is located on the web of the first shoe and includes an active part interposed retractably between the first end of the web of the first shoe and one end of the force-transmission device.

Advantageously, this brace is located retractably between these two components, and preferably so that it can pivot. It is then possible to move the brace between a first position in which an active part of the brace is interposed between the force-transmission device and the web of the first shoe and moves the web of the first shoe from the end of the variable-length strut, and a second position in which the web of the first shoe is bearing on the end of the variable-length strut under the action of the tension spring.

Thus, when the brace is brought into its second position, its active part is no longer located between the web of the first shoe and the force-transmission device, so that the first shoe can move towards the other shoe, bearing on the variable-length strut, so that it becomes possible to extract the shoes from the drum brake so equipped, in the same way as for a conventional drum brake.

Other objects, features and advantages of the present invention will emerge more clearly from the description which follows of one embodiment given by way of illustration with reference to the appended drawings in which:

FIG. 1 represents a front-on view of a drum brake produced in accordance with the present invention, the drum having been omitted;

FIG. 2 represents a section on the line II—II of FIG. 1;

FIG. 3 represents a view in perspective of a mechanical actuation lever used in the drum brake of FIG. 1;

FIG. 4 represents a view in perspective of a force-distribution lever used in the drum brake of FIG. 1;

FIG. 7 represents a view similar to that of FIG. 5, from which some elements have been omitted to make the drawing easier to understand, and in which the brace occupies a first position, and FIG. 8 represents a view similar to that of FIG. 7, in which the brace occupies a second position.

Figure 5:
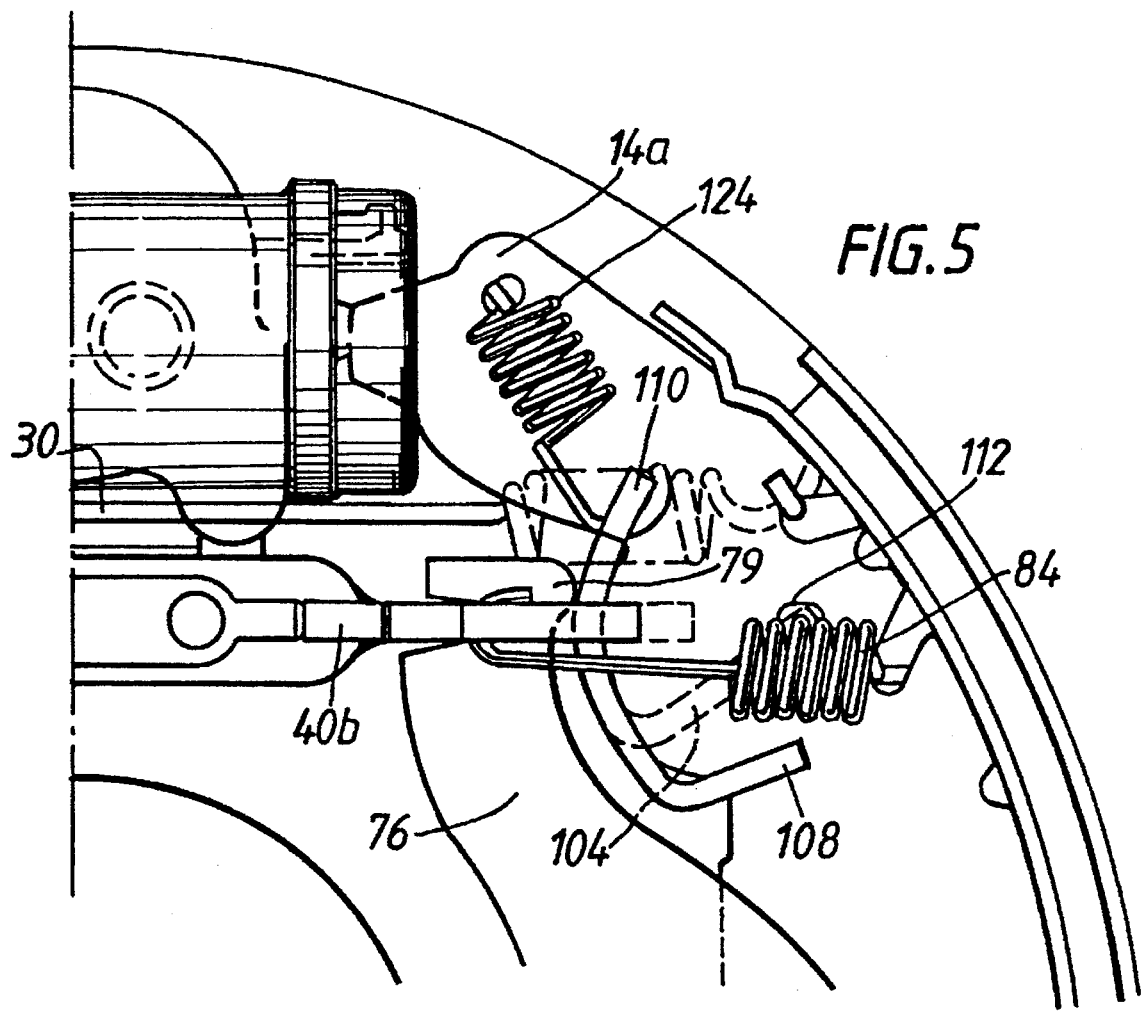
FIG. 5 represents a detail of FIG. 1 on a larger scale.

The drum brake represented in the figures, corresponding for example to the one which is described in the aforementioned document FR-A-2,697,600, includes a carrier plate 10 consisting of a substantially flat disk. This carrier plate is designed to be secured to a stationary part of a vehicle, such as a stub-axle holder (not represented).

Two brake shoes 12 and 14 are supported in a sliding fashion on the carrier plate, by known means (not represented). Conventionally, each shoe consists of a web 12a and 14a respectively, which is substantially flat, and to which is fastened a rim section 14a and 14b respectively, in the shape of an arc of a circle supporting a friction lining 16 and 18 respectively, on its outer face.

The shoes 12 and 14 are placed on the carrier plate 10 so that the outer envelopes of the linings 16 and 18 are situated on one and the same circle, the axis of which merges with the axis of the carrier plate 10, so that the linings 16 and 18 can come into contact with the interior surface of a brake drum 20 covering the two shoes and represented partially in dashes in FIG. 1. The drum 20 is concentric with the linings 16 and 18 and it is fastened to a rotating part of the vehicle, such as a wheel (not represented).

A hydraulically controlled brake motor 22 is fastened to the carrier plate 10 between two adjacent first ends of the shoes 12 and 14. The brake motor 22 is equipped with two pistons 24 and 26 which operate in opposition so as to exert a thrust on the corresponding end of the web 12a, 14a of each of the shoes when the brake motor is actuated.

A bearing piece 28, also fastened to the carrier plate 10, is placed between the other two adjacent ends of the shoes 12 and 14.

A tension spring 30, just the ends of which have been represented in FIG. 1, is interposed between the ends of the webs of the shoes between which the brake motor 22 is placed, in immediate proximity to the latter, in order to bring these ends closer together when the brake motor is at rest.

A spacer piece 32 of fixed length is located between the shoes 12 and 14 in the vicinity of the bearing piece 28, substantially in parallel with the axis of the brake motor 22 and at its ends includes notches 36 and 38 interacting with corresponding notches formed in the webs of the shoes 12 and 14 respectively. A tension spring 34 interposed between the corresponding ends of the webs of the shoes 12 and 14 keeps these webs bearing against the spacer piece 32.

In the position of rest, the distance between the end of the notches 36 and 38 is such that a slight clearance J exists between the ends of the webs 12a and 14a of the shoes and the bearing piece 28, as has been represented in FIG. 1. As an alternative, provision may be made for the ends of the webs 12a and 14a to be in contact with the bearing piece 28 and for the distance between the end of the notches 36 and 38 to be greater than the length of the spacer piece 32 by a small value J.

A variable-length strut 40 is located between the shoes 12 and 14, in the vicinity of the brake motor 22, substantially in parallel with the axis of the latter. It is equipped with screw-nut automatic adjustment means between two terminal pieces 40a and 40b, making it possible to increase the length of the strut 40 in a known fashion in order to compensate progressively for the wear of the friction linings 16 and 18.

A mechanical actuation device, denoted overall by the reference 50, includes a mechanical actuation lever 60 and a force-transmission lever 70.

The actuation lever 60, represented alone in FIG. 3, is formed of a flat piece of substantially rectangular shape, with a first end 62 designed to have an operating cable (not represented) hooked onto it, and a second end 64 forming a lug extending perpendicularly to the plane of the lever 60. An opening 66 is formed in the lever 60, at an intermediate point close to the end 64.

The force-transmission lever 70, represented alone in FIG. 4, is formed of a flat piece of substantially rectangular shape, with a first end 72 formed with a notch 74 interacting with the notch 38 formed in the spacer piece 32.

The other end 76 is formed with a part 78 extending in a plane which is offset parallel to the plane of the lever 70 by an amount which is close to the thickness of the lever 70. The end 76 includes on one of its edges a notch 77 which is intended to interact with a corresponding notch formed in the terminal piece 40b of the strut 40, and on the other edge has a protuberance 79. The lever 70 has a pin 80 extending perpendicularly to its plane, and a hole 82 is formed close to this pin 80.

As better seen in FIG. 2, the levers 60 and 70 are located on either side of the web 14a of the shoe 14, so that the pin 80 of the lever 70 penetrates the opening 66 of the lever 60, and so that the lug 64 penetrates into the hole 82 and bears on the edge of the web 14a, the levers 60 and 70 being thus articulated to each other. As an alternative, it would of course be possible to envisage forming the pin 80 on the lever 60 and the opening 66 in the lever 70.

Figure 6A:
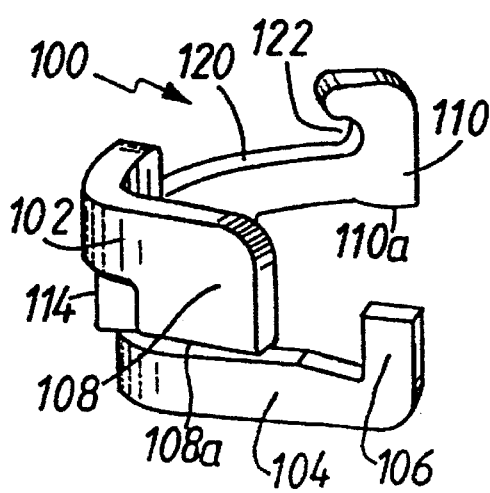
FIGS. 6A and 6B represent two views in perspective of a brace used in the drum brake of FIG. 1.
Figure 6B:
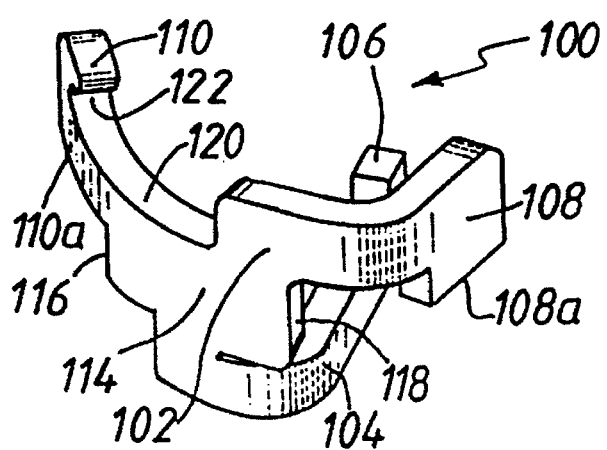

In accordance with the present invention, the drum brake also includes a brace, denoted overall by the reference 100. As better seen in FIGS. 6A and 6B, the brace 100 includes a part 102 substantially in the shape of an arc of a circle integral with an arm 104, extending substantially radially with respect to the part 102, and ending in a finger 106 extending substantially perpendicularly to the arm 104, in the vicinity of the center of curvature of the part 102 in the shape of an arc of a circle.

The ends 108 and 110 of the part 102 in the shape of an arc of a circle are each formed with a bearing surface 108a and 110a respectively, which surfaces come to bear on one face of the web 14a of the shoe 14, while the arm 104 extends on the other side of the web 14a, the finger 106 penetrating into an opening 112 formed in the web 14a. In that way, the brace 100 is rendered captive by the shoe 14, in the same way as captive fixtures.

Between the part 102 in the shape of an arc of a circle, and the arm 104, the brace includes an active part 114 which forms an axial extension of the part 102 and which is delimited by two parallel edges 116 and 118. One of the ends 110 of the part 102 in the shape of an arc of a circle is formed with a substantially rectangular cutout 120, one end edge 112 of which forms a hooking part for fastening onto one end of a return spring 124, the other end of which is fastened onto the web 14a.

When the drum brake is assembled and in the position of rest as has been represented in FIGS. 1, 5 and 7, the brace 100 is interposed between the end of the lever 76 and the web 14a of the shoe 14, and it is urged by the spring 124 into the position represented in these figures, in which the edge 116 of the active part 114 is in abutment on the terminal piece 40b of the strut 40.

In this position, the notch 77 in the lever 70 is bearing on the terminal piece 40b of the strut 40, the active part 114 of the brace 100 is bearing on the protuberance 79 of the lever 70, the web 14a of the shoe 14 is bearing on the active part 114 under the action of a tension spring 84, the ends of which are hooked respectively onto the web of the shoe 14 and onto the terminal piece 40b. Likewise, the terminal piece 40a is urged towards the web of the shoe 12 by a tension spring 86.

The operation of the drum brake will now be described. At rest, the various elements occupy the positions represented in FIGS. 1, 5 and 7.

The force-transmission lever 70 is bearing via the notch 77 on the strut 40, via the notch 74 on the spacer piece 32, and via the pin 80 on the web 14a of the shoe 14. The mechanical actuation lever 60 is bearing via the opening 66 on the pin 80 of the lever 70, and via the lug 64 on the web 14a.

When the brake is hydraulically operated, the pressurization of the brake motor 22 urges the shoes 12 and 14 radially in order to bring the friction linings 16 and 18 into frictional contact with the interior surface of the drum 20. If, during this operation, the shoes 12 and 14 separate by a distance greater than a predetermined value owing to wear on the friction linings 16 and 18, the strut 40 automatically extends, the terminal piece 40a remaining in contact with the web 12a under the action of the spring 86, and the terminal piece 40b bearing on the end 78 of the lever 70, itself bearing on the active part 114 of the strut 100 bearing on the web 14a under the action of the spring 84.

When the brake is mechanically operated, the end 62 of the actuating lever 60 is urged to the left when considering FIG. 1. The lever 60 then bears via its lug 64 on the web 14a of the shoe 14, and the opening 66 interacts with the pin 80 in order to urge the force-transmission lever 70 also to the left. The lug 64 moving freely in the hole 82 in the lever 70 urges the shoe 14 to the right, whilst the lever 70 urges the shoe 12 to the left, via the strut 40 and the spacer piece 32. The lever 70, actuated via its pin 80, acts like a balance bar on the strut 40 and the spacer piece 32, and thus plays the part of transmitting and distributing onto the shoe 12 the forces applied by the lever 60 acting on the shoe 14.

During the use of the drum brake which has just been described, wear of the interior surface of the drum often arises, the friction linings 16 and 18 wearing a continuous track therein. Through action of the strut 40 for automatically taking up wear, the friction linings 16 and 18 are always at quite a small distance from this track, so that it can become impossible to dismantle the drum brake, for example to replace the drum itself or the shoes, or for servicing operations on the brake.

The present invention makes it possible to overcome this difficulty in a very simple way. In fact, from the foregoing explanations, it will have been understood that it is sufficient to tilt the brace 100 from its first position represented in FIG. 7 into a second position represented in FIG. 8 and in which the active part 114 is away from the protuberance 79 of the lever 70. The tilting into the second position is limited by the edge 108 of the active part 118 coming into abutment on the web 14a of the shoe 14, so that the bearing surface 110a remains in contact with the web of the shoe 14.

When the brace is in this second position, the tension spring 30 acts on the shoe 14 so as to bring it closer to the other shoe 12 until the web 14a comes into abutment on the protuberance 79 of the lever 70. The shoe 14 thus moves over a distance equal to the thickness of the active part 114. This thickness of the material forming the brace 100 will of course be chosen to be greater than the maximum tolerated depth for the track worn by the friction linings on the internal surface of the drum 20.

In that way, it will therefore always be possible, after having tilted the brace into its second position, to dismantle the drum brake in order to gain access to its constituent members, and thus work on its components.

The brace is tilted between its two positions very simply by rotating it, about the finger 106 penetrating into the opening 112 and forming a pivot for the brace 100. As has been represented, the opening 112 will advantageously be made in the web 14a substantially in the extension of the strut 40.

Such a rotation can be brought about by means of a suitable tool such as a screwdriver. For this purpose, provision may be made to form an opening 90, as has been represented in FIGS. 7 and 8, in the carrier plate 10 in the vicinity of the end of the shoe 14 and substantially in a region situated in the direction of action of the variable-length strut (40) so that it will thus be possible to act on the arm 104 of the brace and to turn it in order to bring the brace into its second position.

When assembling the drum brake according to the invention, whether this be the initial mounting or a remounting after work or maintenance, the brace is placed in its second position to facilitate this assembly. Once all the components are in place, it is then sufficient to actuate the drum brake by means of the mechanical actuation device.

Indeed, in the event of such mechanical actuation, and as was explained above, the lever 60 bears via its lug 64 on the web 14a of the shoe 14 in order to urge it towards the right considering FIG. 1, and the opening 66 interacts with the pin 80 in order to urge the force-transmission lever 70 to the left. The web 14a thus moves away from the extension 79 on which it was bearing, until the distance between these two components becomes at least equal to the thickness of the active part 114 of the brace.

Under these conditions, the spring 124 returns the brace to its first position until the edge 116 of the active part 114 comes back into abutment on the terminal part 40b of the strut 40. The drum brake is then in a configuration as described above, allowing, without preference, hydraulic or mechanical actuation, with the respective advantages of each of these modes of actuation, and also allowing the drum brake to be dismantled easily under all circumstances.

Of course, the invention is not limited to the embodiments which have been described and represented, but can on the contrary receive numerous modifications which will be obvious to the expert and which fall within the scope of the appended claims. Thus, for example, the mechanical actuation device and the brace 100 can be located on the leading shoe 12 instead of the trailing shoe 14, as represented and explained.

We claim:

1. A drum brake including a carrier plate on which there are slidably mounted first and second shoes each one including a web and a rim section of which the face opposite the drum receives a friction lining capable of being brought into frictional engagement against an internal face of the drum by a hydraulic actuation device acting on a first end of said webs of said first and second shoes, a variable-length strut which in interaction with a tension spring, determines the se of said first and second shoes and which is located in the of said hydraulic actuation device a second end on said first and second webs of the shoes bearing, when the drum brake is at rest or hydraulically actuated, on a bearing piece integral with said carrier plate, said drum brake further comprising a mechanical actuation device for bringing said friction linings into frictional engagement against said internal face of said drum and said first and second webs on said shoes away from said bearing piece by means of a force-transmission device mounted on the web of said first shoe and bearing, when the drum brake is mechanically actuated, on the web of said second shoe by means of said variable-length strut and means for joining the two shoes together, characterized in that a brace is located on said web of said first shoe that includes an active part interposed retractably between said first end of said web of said first shoe and a first end of said force-transmission device.

2. The drum brake according to claim 1, characterized in that said brace is mounted so that it can pivot on the web of said first shoe.

3. The drum brake according to claim 2, characterized in that said brace can move between a first position in which said active part of said brace is interposed between a first end of said force-transmission device and said first end of the web of said first shoe in a zone located substantially in the direction of action of said variable-length strut, and a second position in which said first end of the web of said first shoe bears on said first end of said force-transmission device under the action of a tension spring.

4. The drum brake according to claim 3, characterized in that said brace is urged into its first position by a return spring located between said first end of the web of said first shoe and a hooking part of said brace.

5. The drum brake according to claim 4, characterized in that said brace includes a substantially in the shape of an arc of a circle comprising bearing surfaces bearing on a first face of the web of said first shoe and integral with an arm formed with a finger forming a pivot for said brace and interacting with an opening made in said first end of the web of said first shoe.

6. The drum brake according to claim 5, characterized in that said part of said brace which is in the shape of an arc of a circle includes a first limit stop which, in the first position, interacts with said end of said variable-length strut.

7. The drum brake according to claims 6, characterized in that said first and second limit stops are formed on either side of said active part of said brace, which forms an axial extension of the part in the shape of an arc of a circle.

8. The drum brake according to claim 5, characterized in that said part of said brace which is in the shape of an arc of a circle includes a second limit stop which, in the second position, interacts with said web of said first shoe.

9. The drum brake according to one of claim 5, characterized in that said bearing surfaces of the part in the shape of an arc of a circle and the arm carrying the pivot of said brace are situated on either side of said web of said first shoe so as to render said brace captive by said first shoe.

10. The drum brake according to claim 1, characterized in that said carrier plate includes an opening in the vicinity of said first end of said first shoe allowing passage of a tool for moving said brace from said first position to said second position.

* * * * *